(12) United States Patent
Padhi et al.

(10) Patent No.: US 12,497,888 B2
(45) Date of Patent: Dec. 16, 2025

(54) CHANNEL DETECTION SYSTEM AND METHOD

(71) Applicant: HALLIBURTON ENERGY SERVICES, INC., Houston, TX (US)

(72) Inventors: Amit Padhi, Cypress, TX (US); Sonali Pattnaik, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 405 days.

(21) Appl. No.: 17/742,504

(22) Filed: May 12, 2022

(65) Prior Publication Data

US 2022/0268145 A1 Aug. 25, 2022

Related U.S. Application Data

(63) Continuation of application No. 16/926,200, filed on Jul. 10, 2020, now abandoned.

(51) Int. Cl.
  *E21B 47/005* (2012.01)
  *E21B 47/002* (2012.01)
  *G01S 15/89* (2006.01)

(52) U.S. Cl.
  CPC ........ *E21B 47/0025* (2020.05); *G01S 15/899* (2013.01); *G01S 15/8997* (2013.01)

(58) Field of Classification Search
  CPC ..... E21B 47/005; E21B 2200/22; G01V 1/50; G01V 1/44; G06N 20/00
  See application file for complete search history.

(56) References Cited

U.S. PATENT DOCUMENTS

| | | | | |
|---|---|---|---|---|
| 3,401,773 A | * | 9/1968 | Synnott, III | G01V 1/50 367/34 |
| 4,255,798 A | * | 3/1981 | Havira | E21B 47/005 367/32 |
| 5,216,638 A | * | 6/1993 | Wright | E21B 47/005 702/6 |
| 5,377,160 A | * | 12/1994 | Tello | G01V 1/52 166/253.1 |
| 5,763,773 A | * | 6/1998 | Birchak | E21B 47/005 73/152.58 |
| 5,907,131 A | * | 5/1999 | Tello | E21B 47/005 181/102 |
| 10,221,673 B2 | | 3/2019 | Frisch et al. | |
| 11,091,999 B2 | * | 8/2021 | Zhang | E21B 47/005 |
| 11,566,517 B2 | * | 1/2023 | Li | E21B 43/10 |
| 2013/0175030 A1 | | 7/2013 | Ige et al. | |
| 2016/0265340 A1 | | 9/2016 | Frisch et al. | |

(Continued)

FOREIGN PATENT DOCUMENTS

WO 2016187242 A1 11/2016

OTHER PUBLICATIONS

Song, R.L. et al., "Numerical simulation of Sector Bond log and improved cement bond image", Geophysics, vol. 77, Issue 4; Jul. 2012; Abstract.

(Continued)

*Primary Examiner* — Kipp C Wallace
(74) *Attorney, Agent, or Firm* — NOVAK DRUCE CARROLL LLP

(57) ABSTRACT

Systems, methods, and computer-readable media are provided for detecting a channel behind casing and generating an image that represents the channel.

14 Claims, 16 Drawing Sheets

(56) References Cited

U.S. PATENT DOCUMENTS

| | | | |
|---|---|---|---|
| 2017/0226844 A1* | 8/2017 | Izuhara | E21B 47/005 |
| 2017/0342817 A1* | 11/2017 | Tello | G01V 1/50 |
| 2018/0003845 A1 | 1/2018 | Sakiyama et al. | |
| 2018/0023383 A1* | 1/2018 | Hori | G01V 1/40 |
| | | | 166/253.1 |
| 2018/0149019 A1 | 5/2018 | Bose et al. | |
| 2019/0055830 A1 | 2/2019 | Skataric et al. | |
| 2019/0195813 A1 | 6/2019 | Teague et al. | |
| 2020/0174149 A1 | 6/2020 | Thiruvenkatanathan | |
| 2022/0007965 A1* | 1/2022 | Tiron | A61B 5/6898 |

OTHER PUBLICATIONS

Vasileios-Marios, Gkortsas et al., "Machine learning for the automated detection of diagnosis-revealing features on leaky flexural wave imager data", AIP Conference Proceedings 2102, 050008 (2019); https://doi.org/10.1063/1.5099774; Published Online: May 8, 2019.

International Search Report and Written Opinion, PCT Application No. PCT/US2020/044588, Mailed on Mar. 15, 2021.

Examination Report; Saudi Arabian Application No. 522441658; mailed Nov. 26, 2023.

* cited by examiner

CHANNEL DETECTION SYSTEM AND METHOD

CROSS-REFERENCE TO RELATED APPLICATIONS

This application is a continuation-in-part of U.S. application Ser. No. 16/926,200 filed Jul. 10, 2020, said application is expressly incorporated herein in their entirety.

TECHNICAL FIELD

The present technology pertains to detecting channels behind casing, and more specifically generating images that represent the channels.

BACKGROUND

Interzonal channeling can cause problems such as water production and depletion of gas drive mechanism, among other problems. It is important to determine the presence of channels and their locations to alleviate their impact on hydrocarbon production. Factors such as mud in a wellbore may affect existing solutions. The conventional solutions have not been accurate or robust enough to rely upon resulting in problems that cannot be adequately addressed.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
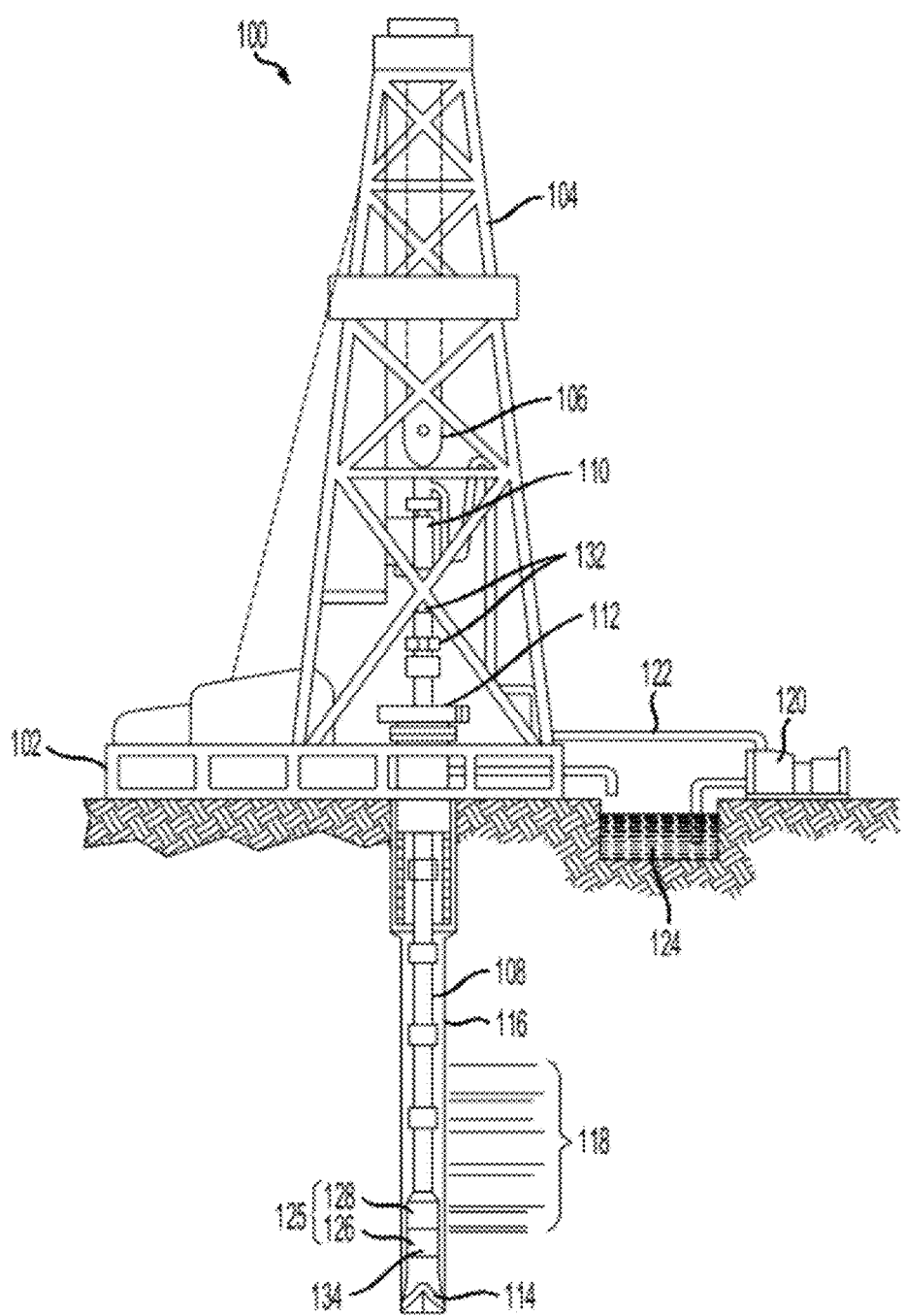
FIG. 1A is a schematic diagram of an example logging while drilling (LWD) wellbore operating environment, in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Disclosed are systems, methods, and computer-readable storage media for detecting channels behind casing, and generating images that represent the channels. The channels may be detected using a monopole acoustic measurement tool having one or more azimuthally arranged receiver rings along the circumference of the tool. The receivers may collect waveforms and determine integral amplitudes based on the waveform data. The data may be used to determine azimuthal location and a size of a channel in a casing by using a machine learning model at a number of depths of interest. A two dimensional image or map can be generated that represents the location and size of the channel in the casing at the number of depths of interest.

According to at least one aspect, an example method for detecting channels behind casing, and generating images that represent the channels is provided. The method can include receiving, by at least one processor, data samples associated with at least one casing, each data sample representing channel information behind a representative casing, training, by the at least one processor, a machine learning model using the data samples to generate a mapping between waveform information in each of the data samples and the channel information behind the representative casing, receiving, by the at least one processor, acoustic data from a tool, the acoustic data representing a particular casing, and using, by the at least one processor, the machine learning model to analyze the acoustic data from the tool and determine one of a presence and an absence of a channel behind the particular casing at a plurality of depths.

According to at least one aspect, an example system for detecting channels behind casing, and generating images that represent the channels is provided. The system can include one or more processors and at least one computer-readable storage medium having stored therein instructions which, when executed by the one or more processors, cause the system to receive data samples associated with a at least one casing, each data sample representing channel information behind a representative casing, train a machine learning model using the data samples to generate a mapping between waveform information in each of the data samples and the channel information behind the representative casing, receive acoustic data from an acoustic tool, the acoustic data representing a particular casing, and use the machine learning model to analyze the acoustic data from the tool and determine one of a presence and an absence of a channel behind the particular casing at a plurality of depths.

According to at least one aspect, an example non-transitory computer-readable storage medium for detecting channels behind casing, and generating images that represent the channels is provided. The non-transitory computer-readable storage medium can include instructions which, when executed by one or more processors, cause the one or more processors to receive data samples associated with a at least one casing, each data sample representing channel information behind a representative casing, train a machine learning model using the data samples to generate a mapping between waveform information in each of the data samples and the channel information behind the representative casing, receive acoustic data from a tool, the acoustic data representing a particular casing, and use the machine learning model to analyze the acoustic data from the tool and determine one of a presence and an absence of a channel behind the particular casing at a plurality of depths.

In some aspects, the systems, methods, and non-transitory computer-readable storage media described above can include generating an azimuthal cement bond depth channel image that represents the presence and the absence of the channel behind the particular casing at the plurality of depths. The channel image may be a binary two-dimensional image. In addition, the binary two-dimensional image can represent a size and an azimuthal location of the channel behind the particular casing at the plurality of depths. The machine learning model can be based on random forest, among other algorithms.

Additionally, the tool can be at least one array of receivers azimuthally arranged along a circumference of the tool. The array of receivers can determine an integral amplitude for waveform data obtained by the at least one array of receivers. In one example, the tool may have eight arrays of receivers that are azimuthally arranged. Each array may have thirteen receivers. At an offset of three feet from the monopole source, there may be a ring of eight receivers. Similarly, at an offset of five feet from monopole source there may be a ring of receivers.

Figure 8:
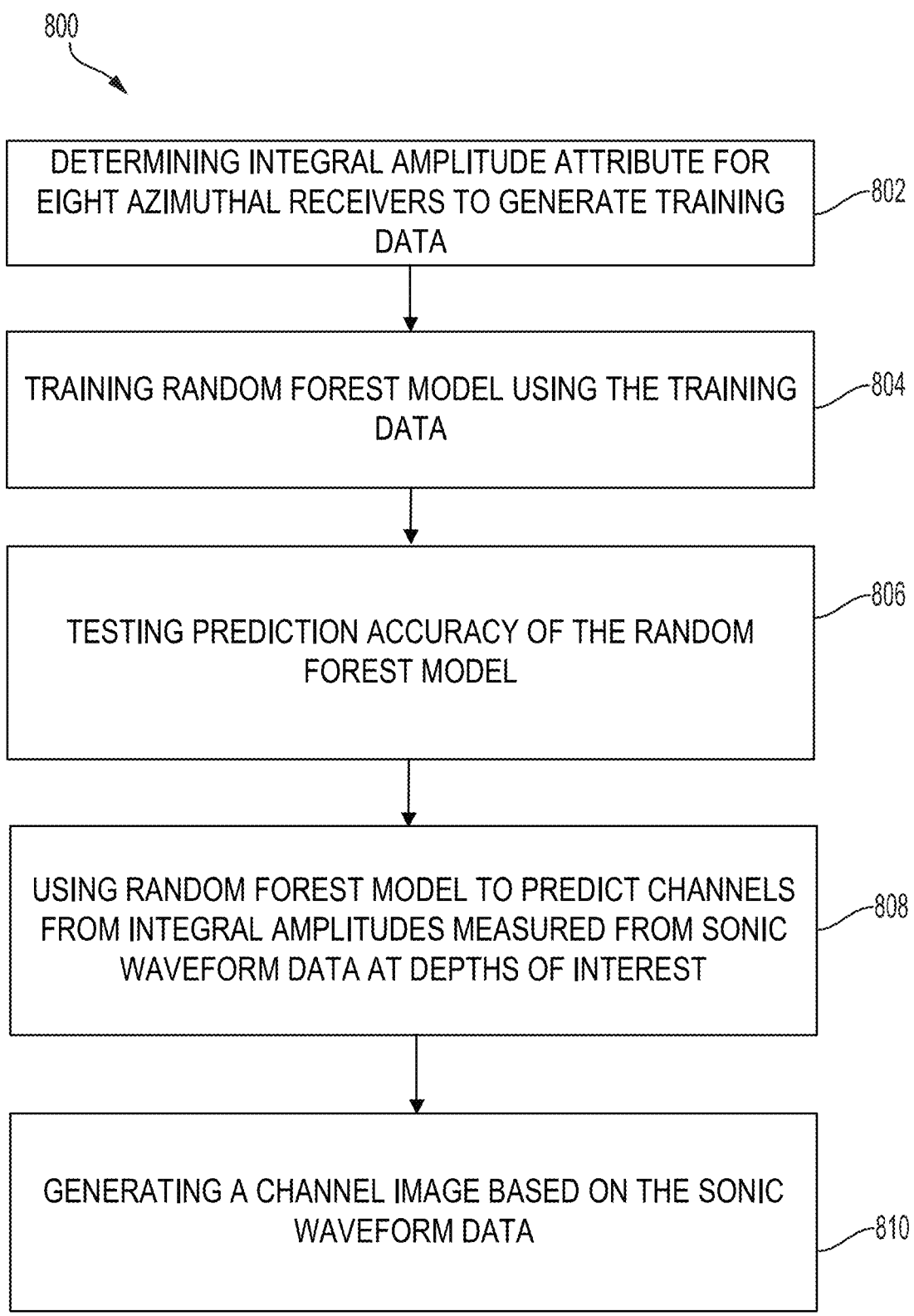
FIG. 8 is a flowchart of an example method for detecting a channel behind casing and generating an image that represents the channel, in accordance with some examples.
Figure 9:
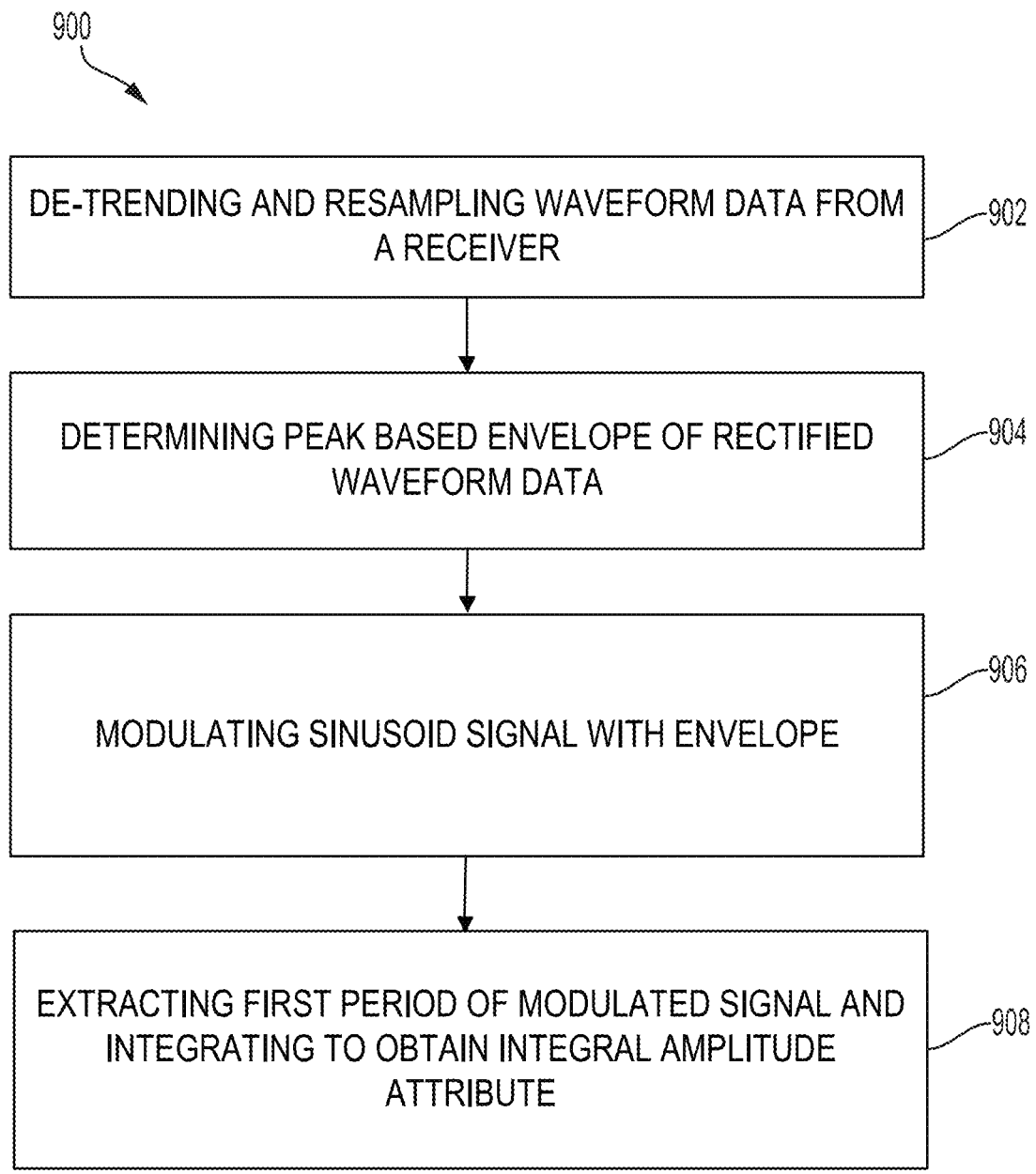
FIG. 9 is another flowchart of an example method for determining an integral amplitude attribute used to detect the channel, in accordance with some examples.
Figure 10:
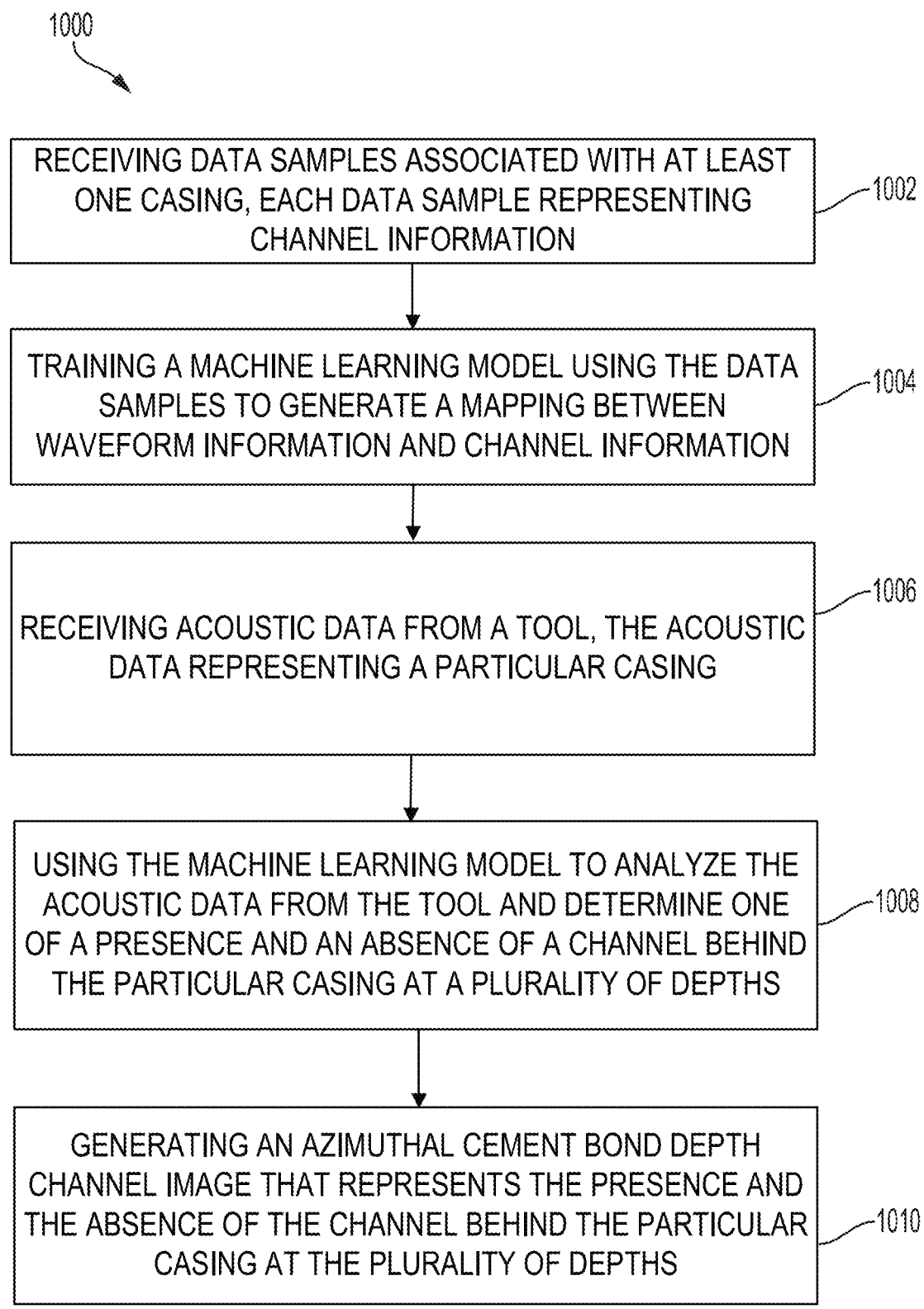
FIG. 10 is a flowchart of an example method for detecting a channel behind casing and generating an image that represents the channel, in accordance with some examples.
Figure 11:
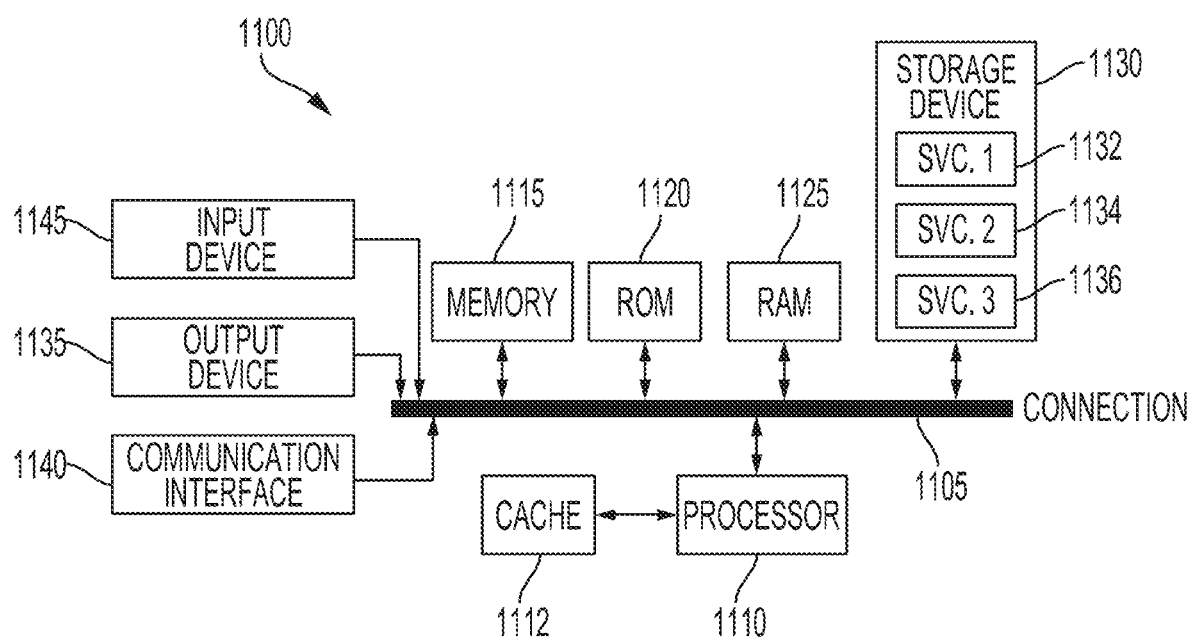
FIG. 11 is a schematic diagram of an example computing device architecture, in accordance with some examples.

As follows, the disclosure will provide a more detailed description of the systems, methods, computer-readable media and techniques herein for detecting channels behind casing, and generating images that represent the channels. The disclosure will begin with a description of example systems and environments, as shown in FIGS. 1A-7. A description of example methods and technologies for detecting channels behind casing, and generating images that represent the channels, as shown in FIGS. 8, 9, and 10 will then follow. The disclosure concludes with a description of an example computing system architecture, as shown in FIG. 11, which can be implemented for performing computing operations and functions disclosed herein. These variations shall be described herein as the various embodiments are set forth.

The disclosure now turns to FIG. 1A, which illustrates a schematic view of a logging while drilling (LWD) wellbore operating environment 100 in accordance with some examples of the present disclosure. As depicted in FIG. 1A, a drilling platform 102 can be equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, the drill bit 114 creates a wellbore 116 that passes through various formations 118. A pump 120 circulates drilling fluid through a supply pipe 122 to top drive 110, down through the interior of drill string 108 and orifices in drill bit 114, back to the surface via the annulus around drill string 108, and into a retention pit 124. The drilling fluid transports cuttings from the wellbore 116 into the retention pit 124 and aids in maintaining the integrity of the wellbore 116. Various materials can be used for drilling fluid, including oil-based fluids and water-based fluids.

Logging tools 126 can be integrated into the bottom-hole assembly 125 near the drill bit 114. As the drill bit 114 extends the wellbore 116 through the formations 118, logging tools 126 collect measurements relating to various formation properties as well as the orientation of the tool and various other drilling conditions. The bottom-hole assembly 125 may also include a telemetry sub 128 to transfer measurement data to a surface receiver 132 and to receive commands from the surface. In at least some cases, the telemetry sub 128 communicates with a surface receiver 132 using mud pulse telemetry. In some instances, the telemetry sub 128 does not communicate with the surface, but rather stores logging data for later retrieval at the surface when the logging assembly is recovered.

Each of the logging tools 126 may include one or more tool components spaced apart from each other and communicatively coupled with one or more wires and/or other media. The logging tools 126 may also include one or more computing devices 134 communicatively coupled with one or more of the one or more tool components by one or more wires and/or other media. The one or more computing devices 134 may be configured to control or monitor a performance of the tool, process logging data, and/or carry out one or more aspects of the methods and processes of the present disclosure.

In at least some instances, one or more of the logging tools 126 may communicate with a surface receiver 132 by a wire, such as wired drillpipe. In other cases, the one or more of the logging tools 126 may communicate with a surface receiver 132 by wireless signal transmission. In at least some cases, one or more of the logging tools 126 may receive electrical power from a wire that extends to the surface, including wires extending through a wired drillpipe.

Figure 1B:
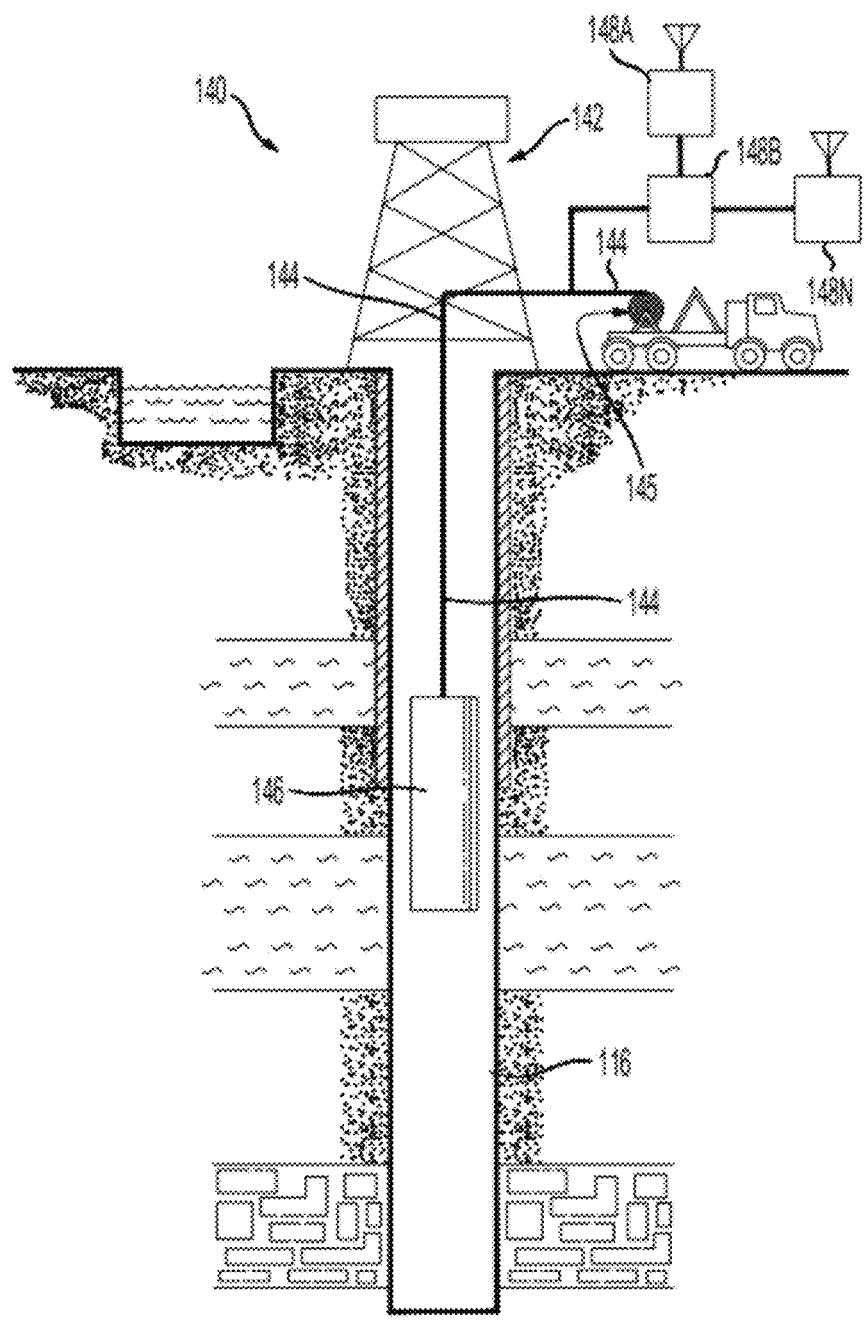
FIG. 1B is a schematic diagram of an example downhole environment with a conveyance, in accordance with some examples.

Referring to FIG. 1B, an example system 140 for downhole line detection in a downhole environment with a conveyance can employ a tool having a tool body 146 in order to carry out logging and/or other operations. For example, instead of using the drill string 108 of FIG. 1A to lower tool body 146, which may contain sensors or other instrumentation for detecting and logging nearby characteristics and conditions of the wellbore 116 and surrounding formation, a wireline conveyance 144 can be used. The tool body 146 can include a resistivity logging tool. The tool body 146 can be lowered into the wellbore 116 by wireline conveyance 144. The wireline conveyance 144 can be anchored in the drill rig 145 or a portable means such as a truck. The wireline conveyance 144 can include one or more wires, slicklines, cables, and/or the like, as well as tubular conveyances such as coiled tubing, joint tubing, or other tubulars.

The illustrated wireline conveyance 144 provides support for the tool, as well as enabling communication between tool processors 148A-N on the surface and providing a power supply. In some examples, the wireline conveyance 144 can include electrical and/or fiber optic cabling for carrying out communications. The wireline conveyance 144 is sufficiently strong and flexible to tether the tool body 146 through the wellbore 116, while also permitting communication through the wireline conveyance 144 to one or more processors 148A-N, which can include local and/or remote processors. Moreover, power can be supplied via the wireline conveyance 144 to meet power requirements of the tool. For slickline or coiled tubing configurations, power can be supplied downhole with a battery or via a downhole generator.

Disclosed herein are systems and methods for detecting channels behind casing and using a machine learning based approach and generating images that represent the channels behind the casing. An image may be an azimuthal cement bond depth image that may be generated using one or more receiver rings azimuthally arranged along a circumference of a monopole acoustic measurement tool. There may any number of receiver rings located at different offsets to generate the image. The method for detecting channels may use a portion of a waveform as detected by the acoustic measurement tool. Conventionally, an E1 peak in the waveform data may have been used. However, the systems and methods discussed herein provide a more robust image that is less affected by noise. In addition, the systems and methods discussed herein utilize machine learning to avoid effects of factors affecting data that cannot be corrected effectively (e.g., mud effects and receiver azimuthal responses at higher frequencies used for cement evaluation).

The system may utilize eight azimuthal receivers including one fixed source-receiver offset or multiple receivers' offset waveform data at a number of depths and may apply preprocessing steps such as resampling and de-trending on the data. The system may then determine an amplitude based attribute (e.g., integral amplitude) for each of the eight receivers. Each of the receivers may be an array of receivers. If the system uses multiple source-receiver offsets, the ring generated attributes may be stacked or combined together to provide more robust calculations. The system may analyze the attributes to determine an azimuthal location and an angular extent of a channel at each depth using a machine learning regression model. Multiple machine learning models may be generated for differing casings and mud specifications and a particular machine learning model may be selected for a particular casing and mud being analyzed.

In one example, the machine learning models may be trained with data that may be collected from controlled laboratory environments and/or simulation data. As a result, each machine learning model may be used to determine channel size and location using a particular tool. The system may determine the channel size and azimuthal location and generate an azimuthal cement bond image that may indicate a presence or the absence of a channel. The image may indicate the presence or absence in the image using a binary mapping. As a result, the image may provide a two-dimensional attribute map that is based on amplitude attributes from the data that may be interpolated and smoothed. The system may be used to detect narrow channels because the machine learning models may convert lower magnitude casing wave amplitude attributes to a corresponding channel specification (e.g., a channel size and location).

The machine learning regression based models may be trained with sonic tool measurements to predict size and location of a channel behind casing. The data may be numerically simulated data and used to train the machine learning algorithm with tool measured waveform data. As a result, the system may be used to provide proof and evidence of the presence of channels with monopole acoustic tools.

Interzonal channeling may cause problems such as water production and depletion of the gas drive mechanism, among others. As a result, detecting the presence of channels and determining their azimuthal location may be important to alleviate impacts on hydrocarbon production.

Conventional solutions may provide high resolution evaluations of the state of cement behind casing using ultrasonic data. A radial bond logging tool may provide cement bond using E1 peak data from sonic data collected using receivers. However, the images are not reliable or as accurate as the system discussed herein. The system is able to utilize a number of azimuthally distributed receivers to generate azimuthal images from sonic data using monopole transmitter tools. E1 peaks may be affected by receiver responses that vary azimuthally at relatively higher frequencies. In addition, mud may affect amplitudes. These factors may affect the conventional images such that they are not reliable.

The system discussed herein may detect channels with more confidence than conventional solutions that may be prone to effects of noise. As a result, the system may be used to provide an azimuthal ultrasonic cement evaluation with a lower frequency/deeper reading sonic frequency result.

In one example, one or more source-receiver offsets may be used to generate an azimuthal cement bond image. For a chosen source-receiver offset, at each depth, the system may obtain eight azimuthally distributed fixed source-receiver offset waveform data. The waveforms may be resampled. As an example, they may be resampled at five microseconds instead of ten microseconds and background trends may be removed.

A time window may be defined by identifying a beginning of a casing wave in the waveform data. The time window may be fixed as long as the casing pipe specifications do not change. Once the time window is defined, an amplitude based attribute (e.g., integral amplitude) may be determined for each of the eight waveforms. As described below, determination of the integral amplitude for a waveform data may be accomplished by determining a peaks based envelope of the rectified waveform and using the envelope to modulate a sinusoid signal. A 30 kHz signal may be used as an example. A first period of the modulated signal may be integrated to obtain an integral amplitude attribute. Eight values may then be used as features for a machine learning regression model to predict channel size and azimuthal location.

A peaks based envelope of a signal or time series can be found by first finding local extrema of the signal that are separated by a specified number of points and then fitting a spline through those local extrema to interpolate and generate the same number of samples as the original signal. The local extrema may be a maxima or minima depending on the desire to find the upper or lower envelope of the signal. In case of upper envelope the local maxima or peaks are found by finding samples of the signal that are larger in terms of amplitude than the two neighboring samples.

Figure 1C:
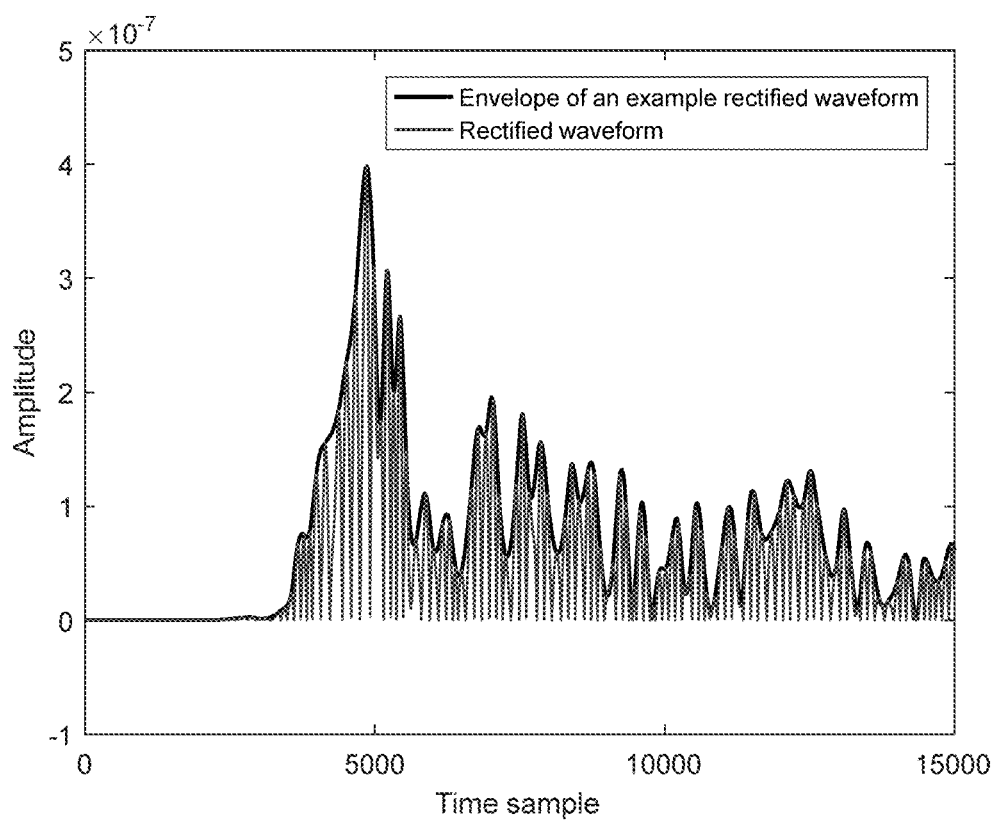
FIG. 1C is an illustration of an envelope of an example rectified waveform.

In one embodiment, the upper envelope is used for further computations as shown in FIG. 1C. A rectified waveform is generated by taking the absolute values of all amplitudes of a waveform. As mentioned earlier, the method to compute the envelope needs specification of a separation of the peaks. That separation ensures that all peaks found are not used in the spline fitting and interpolation to generate the final envelope. In some embodiments, a mathematical programming language, such as MATLAB, available from Mathworks of Portola Valley, California, may be used to determine the peaks based envelope.

Figure 1D:
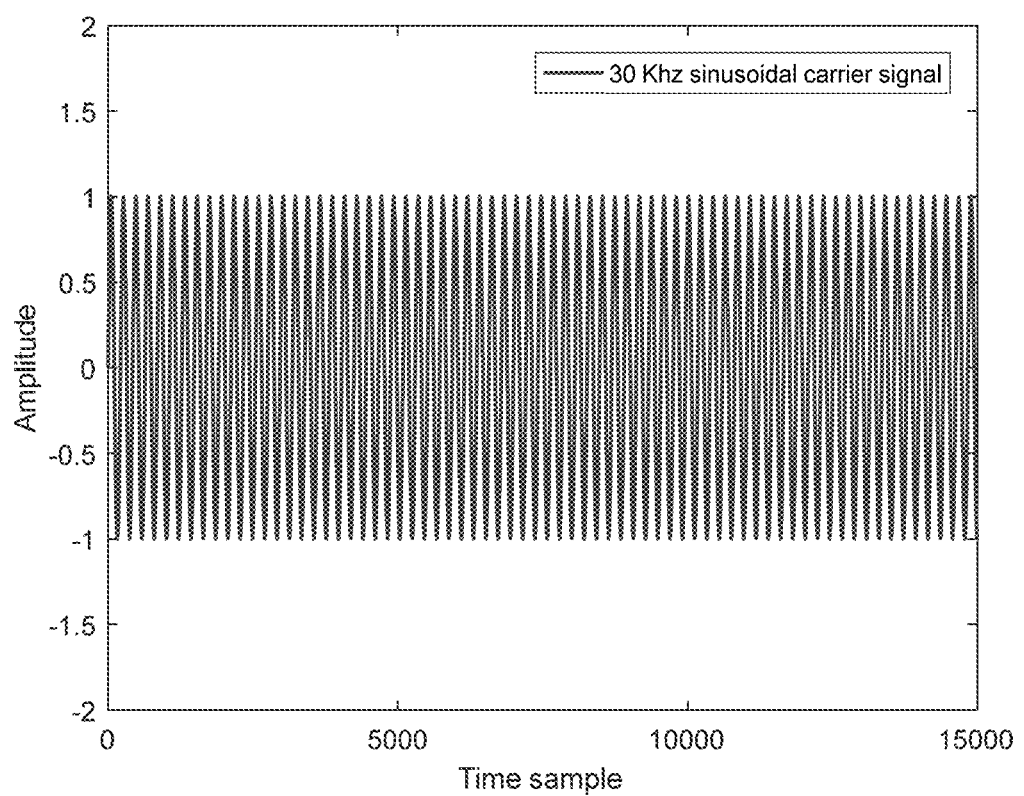
FIG. 1D is an illustration of a sinusoidal signal.
Figure 1E:
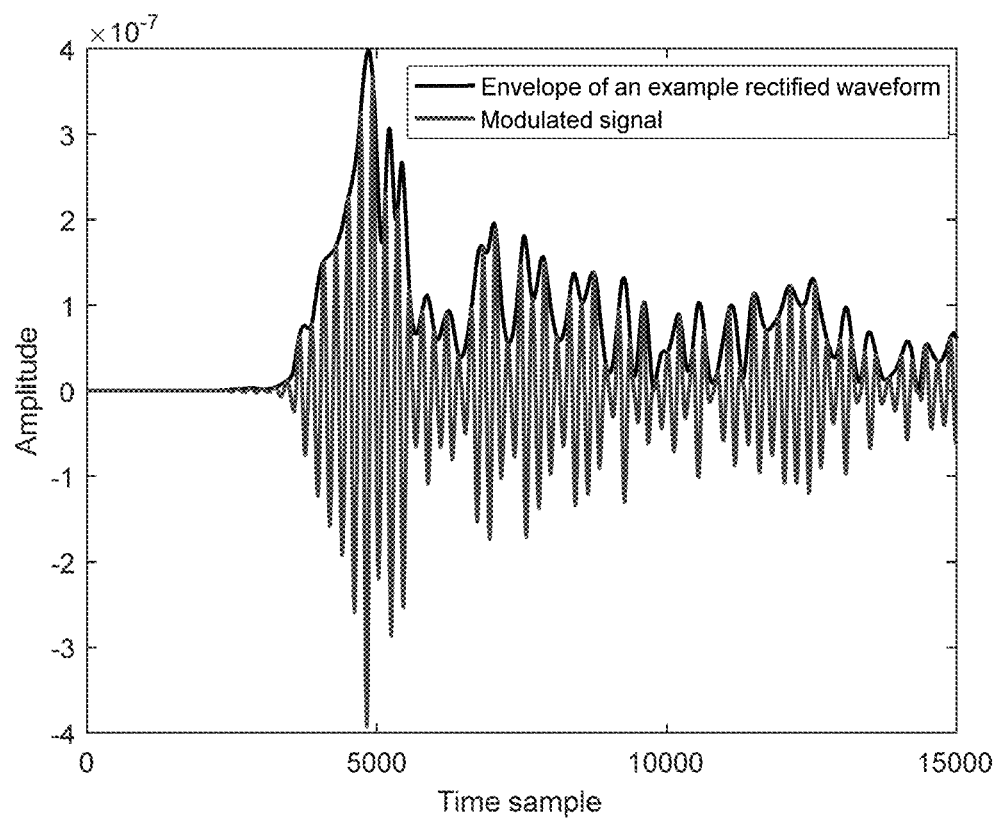
FIG. 1E is an illustration of a peaks based envelope computed for an example rectified waveform along with a corresponding modulated sinusoidal signal.

After the peaks based envelope is computed it is used to modulate a carrier signal, which may be sinusoidal signal. The frequency of the sinusoidal signal has been chosen to be 30 Khz but it may be replaced with other appropriate frequencies in the Khz range. FIG. 1D shows such a sinusoidal signal. In FIG. 1E, a peaks based envelope computed for an example rectified waveform has been shown along with the corresponding modulated sinusoidal signal. The modulated signal is generated by multiplying the sinusoidal signal in FIG. 1D with the envelope in FIG. 1E, sample by sample.

Figure 1F:
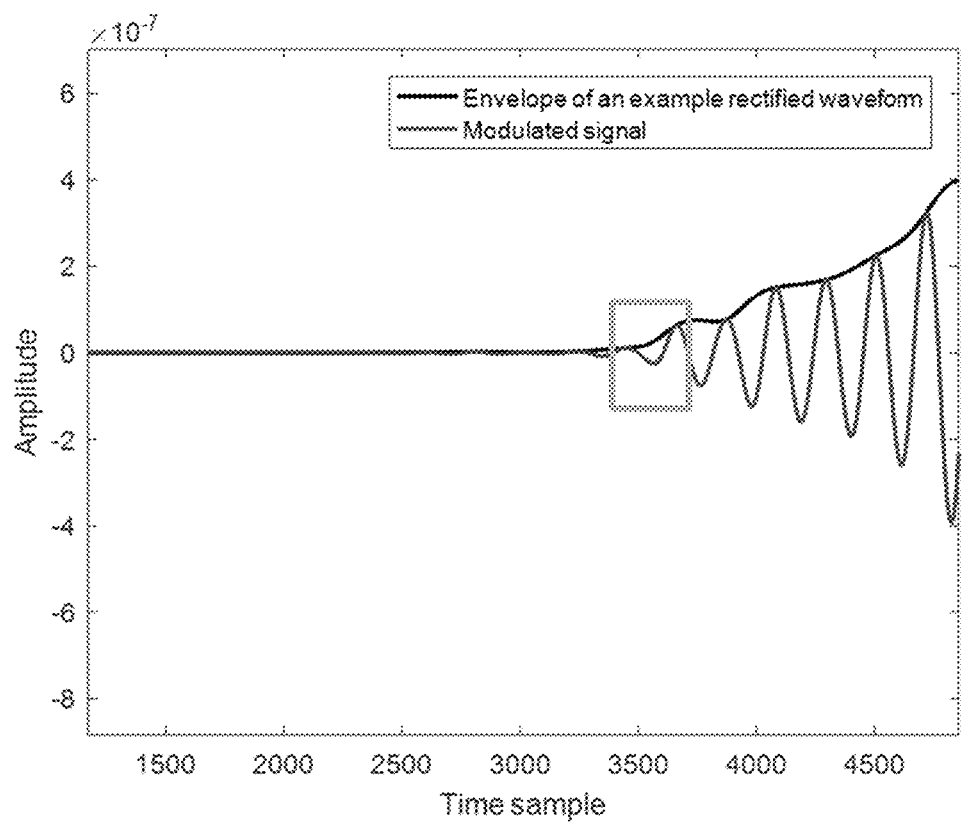
FIG. 1F is an illustration of a first period of the computed modulated signal used to determine an integral amplitude.

In the exemplary embodiment of FIG. 1F, the first period of the computed modulated signal is chosen for the evaluation of an attribute called integral amplitude. The absolute values of the amplitudes of the modulated signal in the chosen first period window are multiplied by the inverse of the sampling frequency and added together to get the integral amplitude value corresponding to the waveform under consideration.

The process may be repeated for a number of depths to produce a two-dimensional channel distribution map image. More than one source-receiver offset may be used such as one receiver three feet away and another receiver five feet away. Individually generated amplitude attributes may be combined and stacked together to reduce noise. The channel map may be generated from the multiple receiver data using the trained machine learning model.

The machine learning model may be trained to predict channel size and location provided the eight integral amplitude values from the receivers. The machine learning model may be based on random forest and/or another machine learning algorithm such as support vector machine (SVM) and neural networks. As an example, 10,000 data samples may be used to train the random forest machine learning model. As an example, a random forest may be an ensemble learning method for classification and regression. It may operate by constructing a multitude of decision trees while training on provided data. The random forest may output a mean prediction of the individual trees. Random forests may be less prone to bias and overfitting as opposed to other machine learning algorithms. The random forest algorithm may be trained using data (e.g., eight integral amplitude values used as features and corresponding channel sizes and locations as realizations of the dependent variables) and generated under controlled conditions for various casing sizes and mud conditions. The training may be used to produce a direct mapping between measurement distribution and channel specification. As a result, the machine learning model may be used to collect data and predict a channel in real-time. In one example, the random forest is trained with data collected by the sonic tool under controlled conditions and then utilized to predict the channel with actual data in real-time.

Figure 2:
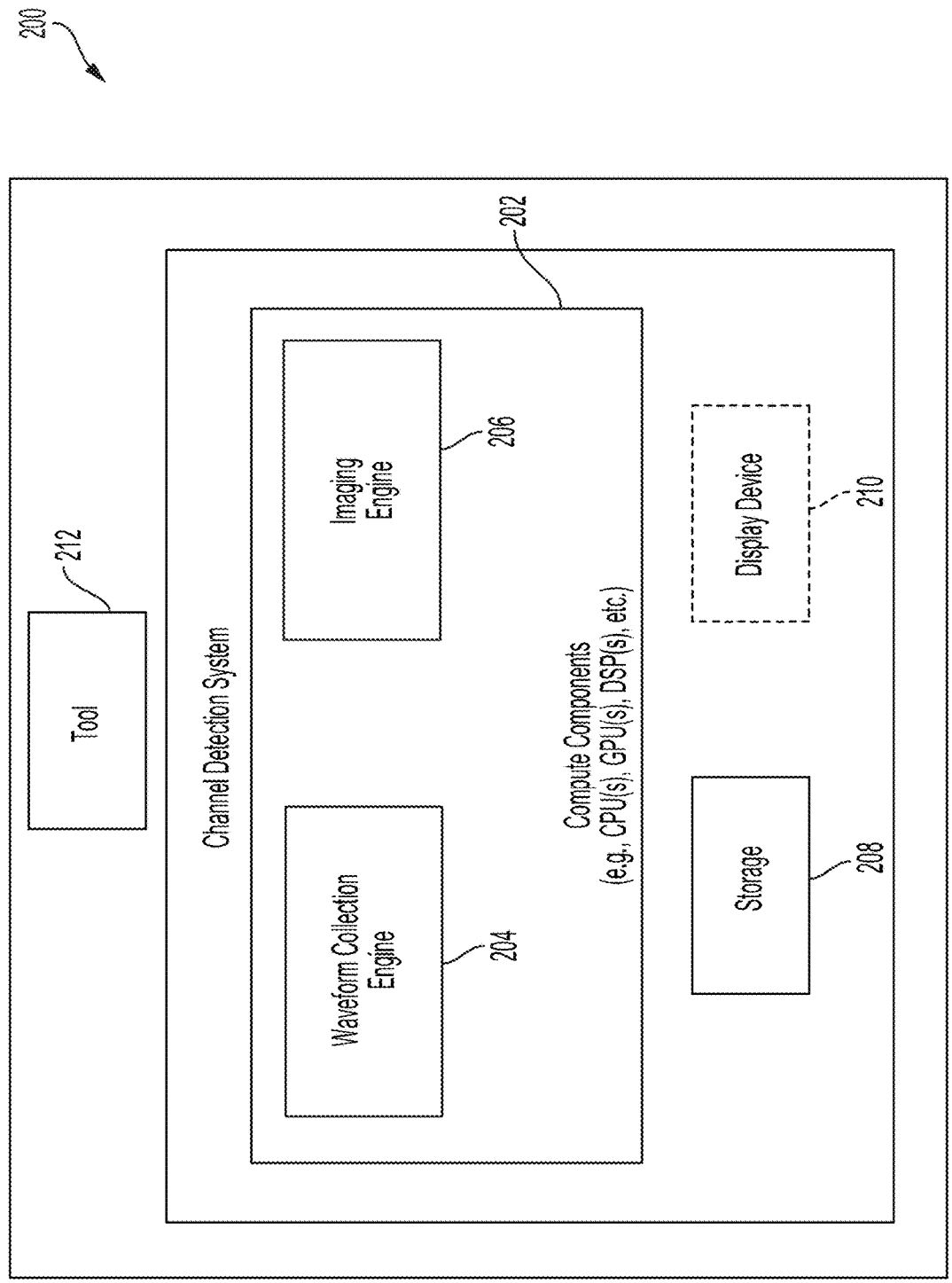
FIG. 2 is a block diagram of an example channel detection system which may be implemented to detect channels behind casing and generate images, in accordance with some examples.

FIG. 2 illustrates a channel detection system 200. The channel detection system 200 can be implemented for detecting channels behind casing, and generating images that represent the channels as described herein. In this example, the channel detection system 200 can include compute components 202, waveform collection engine 204, imaging engine 206, a storage 208, and a tool or device 212. In some implementations, the channel detection system 200 can also include a display device 210 for displaying data and graphical elements such as images, videos, text, simulations, and any other media or data content.

The tool 212 may be a monopole acoustic measurement tool or device that includes one or more receiver rings azimuthally arranged along the circumference of the tool. There may be any number of rings (e.g., eight) located at different offsets to receive and collect waveform data that may be used to generate an image.

The channel detection system 200 can be part of, or implemented by, one or more computing devices, such as one or more servers, one or more personal computers, one or more processors, one or more mobile devices (for example, a smartphone, a camera, a laptop computer, a tablet computer, a smart device, etc.), and/or any other suitable electronic device. In some cases, the one or more computing devices that include or implement the channel detection system 200 can include one or more hardware components such as, for example, one or more wireless transceivers, one or more input devices, one or more output devices (for example, display device 210), one or more sensors (for example, an image sensor, a temperature sensor, a pressure sensor, an altitude sensor, a proximity sensor, an inertial measurement unit, etc.), one or more storage devices (for example, storage system 208), one or more processing devices (for example, compute components 202), etc.

As previously mentioned, the channel detection system 200 can include compute components 202. The compute components can be used to implement the waveform collection engine 204, the imaging engine 206, and/or any other computing component. The compute components 202 can also be used to control, communicate with, and/or interact with the storage 208 and/or the display device 210. The compute components 202 can include electronic circuits and/or other electronic hardware, such as, for example and without limitation, one or more programmable electronic circuits. For example, the compute components 202 can include one or more microprocessors, one or more graphics processing units (GPUs), one or more digital signal processors (DSPs), one or more central processing units (CPUs), one or more image signal processors (ISPs), and/or any other suitable electronic circuits and/or hardware. Moreover, the compute components 202 can include and/or can be implemented using computer software, firmware, or any combination thereof, to perform the various operations described herein.

The waveform engine 204 can be used to receive data samples associated with training a machine learning algorithm such as random forest. As an example, the waveform engine 204 may receive approximately 10,000 data samples to train the random forest. The data samples may be collected by the tool 212 and/or may be synthetically generated or simulated. The data samples may represent waveforms or casing waves that may be generated under controlled conditions for various casing sizes and mud conditions. As a result, the machine learning algorithm may be trained with the data samples to produce a direct mapping between the data samples and channel specifications such as channel size and location.

The waveform engine 204 can be used to determine integral amplitudes for the azimuthal receivers associated with the tool 212. The trained model may then be used to predict channels using the integral amplitudes from sonic waveform data at depths of interest.

Based on the predicted channel information, the imaging engine 206 may generate a two dimensional image or map that indicates the presence and/or absence of channels. As an example, the two dimensional image may indicate a predicted channel size and location. The image may indicate where the channel is located in the azimuth in degrees and depth, among other information.

The storage 208 can be any storage device(s) for storing data. In some examples, the storage 208 can include a buffer or cache for storing data for processing by the compute components 202. Moreover, the storage 208 can store data from any of the components of the memory tool activation and control system 200. For example, the storage 208 can store input data used by the channel detection system 200, outputs or results generated by the channel detection system 200 (for example, data and/or calculations from the waveform collection engine 204, the imaging engine 206, etc.), user preferences, parameters and configurations, data logs, documents, software, media items, GUI content, and/or any other data and content.

While the channel detection system 200 is shown in FIG. 2 to include certain components, one of ordinary skill in the art will appreciate that the channel detection system 200 can include more or fewer components than those shown in FIG. 2. For example, the channel detection system 200 can also include one or more memory components (for example, one or more RAMs, ROMs, caches, buffers, and/or the like), one or more input components, one or more output components, one or more processing devices, and/or one or more hardware components that are not shown in FIG. 2.

Figure 3:
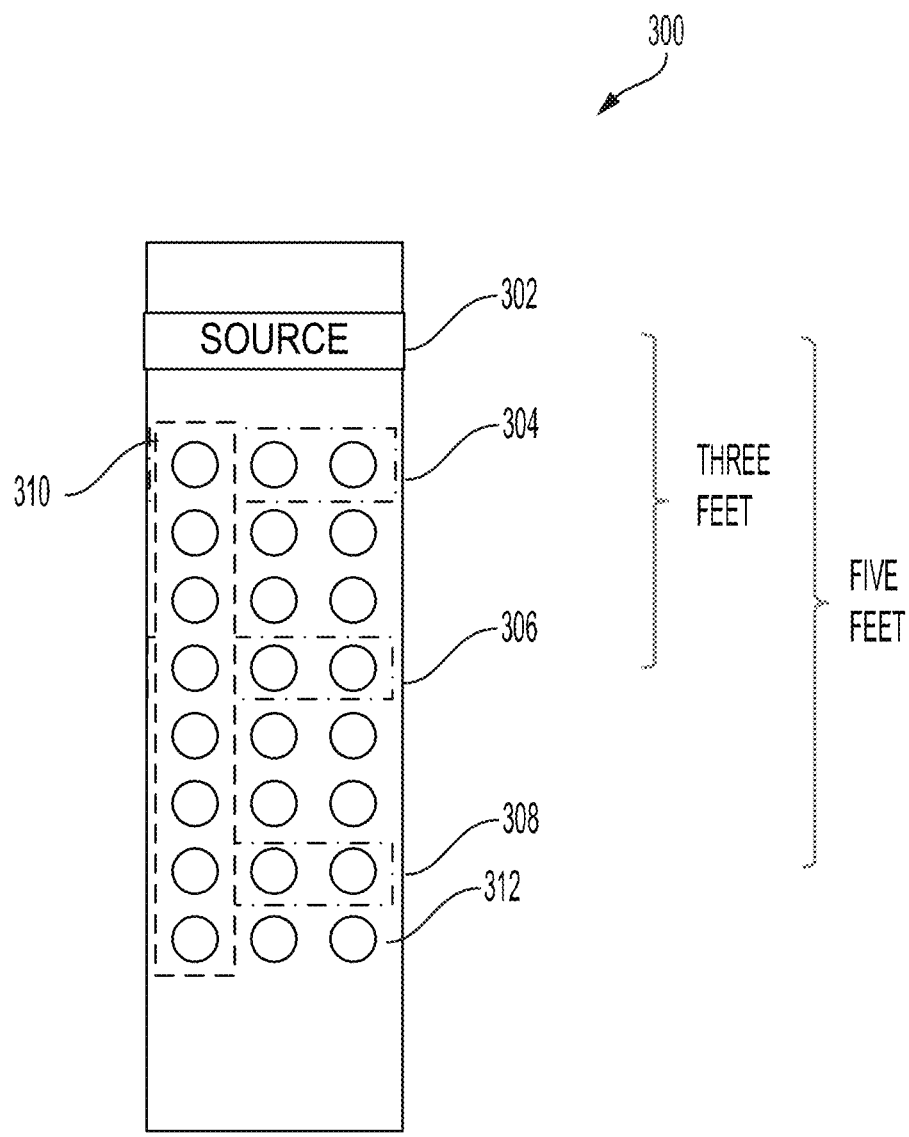
FIG. 3 is a block diagram of an example acoustic tool associated with the system, in accordance with some examples.

FIG. 3 shows an example acoustic tool 300 associated with the system according to an example. A monopole source is shown at 302. As shown in FIG. 3, a two-dimensional view of the tool shows three visible arrays 310 of the tool 300. As an example, eight such azimuthally arranged arrays 310 having 45 degrees of separation may be present on the tool 300. As noted above, each array 310 may have thirteen receivers 312, although only eight receivers are shown in each array 310 in FIG. 3. The other five arrays of receivers are not visible in this two-dimensional view of the tool 300. The design of the arrays is not limited to this arrangement and may differ. As an example, at a particular offset, there may be a ring of receivers 304. Each ring of receivers may include eight receivers, or another number of receivers. A ring of receivers 306 may be at one offset, e.g., three feet from the source. A ring of receivers 308 may be at a second offset, e.g., five feet from the source. There may be a spacing between each ring of receivers, e.g., 0.5 feet.

Figure 4:
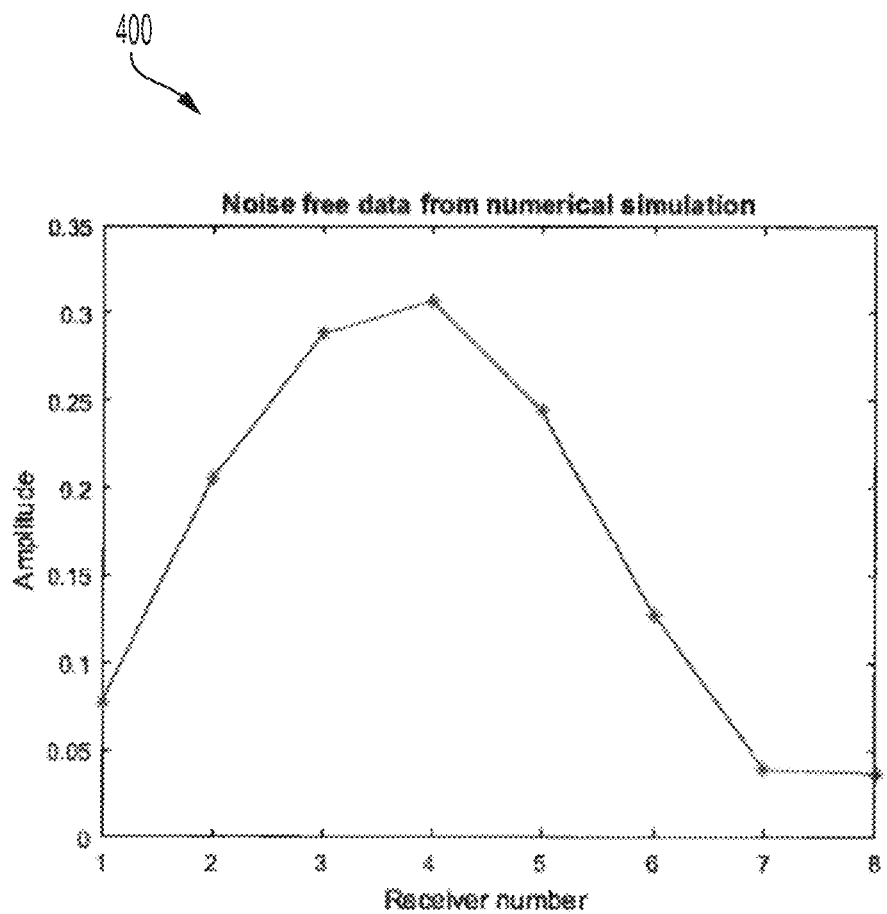
FIG. 4 is a graph of example waveform derived attribute data used to train a machine learning model, in accordance with some examples.

FIG. 4 is a graph 400 of example waveform data used to train a machine learning model according to an example. FIG. 4 shows a graph of noise free data from a numerical simulation including data collected from each receiver and an associated amplitude. The plot shown includes the integral amplitudes for eight azimuthal receivers in the presence of a ninety degree channel in the cement and it may be generated using finite difference simulations.

The data shown represents a plot of integral amplitudes with a ninety degree channel in cement located at one hundred and twenty degrees with respect to the reference axis. The waveform data may be determined using finite difference code. As a result, the integral amplitudes may be determined from controlled experiment data similarly for training and integral amplitudes collected from data may be used with the trained machine learning model to predict channels.

Figure 5:
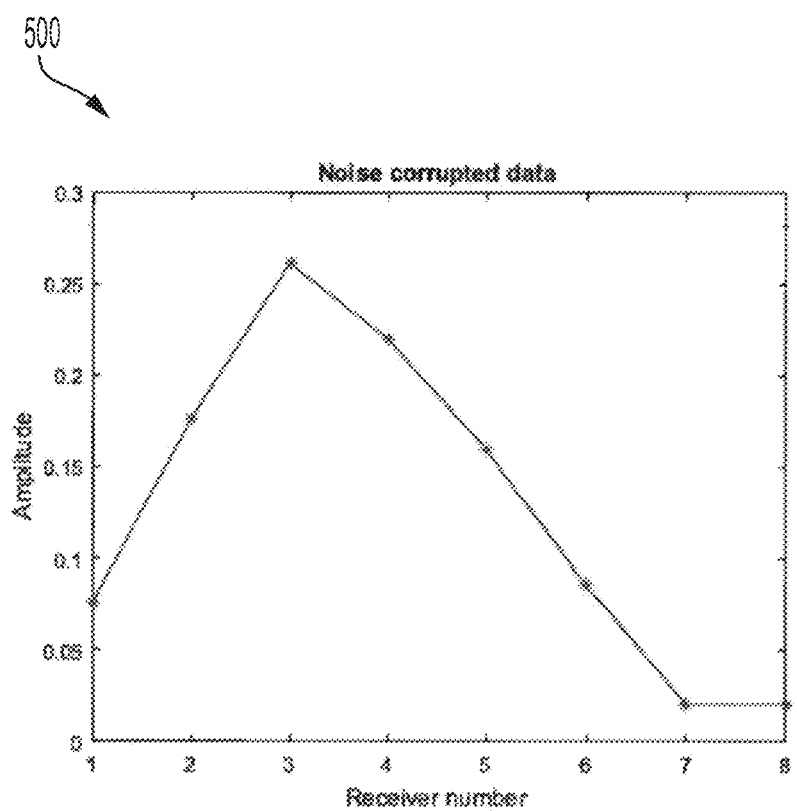
FIG. 5 is another graph of example waveform derived attribute data used to train the machine learning model, in accordance with some examples.

FIG. 5 is a graph 500 of example waveform data used to train the machine learning model according to an example. FIG. 5 shows a graph of noise corrupted data including data collected from each receiver and an associated amplitude. The plot shown in FIG. 5 indicates the integral amplitudes that are multiplied with an artificial azimuthal response and adding 10% random noise. In other words, the data shown represents a plot of integral amplitudes with a ninety degree channel in cement located at one hundred and twenty degrees with respect to the reference axis. The values may be multiplied with an artificial azimuthal receiver response function and as shown random noise may be added. As a result, the waveform data may be determined using finite difference code.

Figure 6:
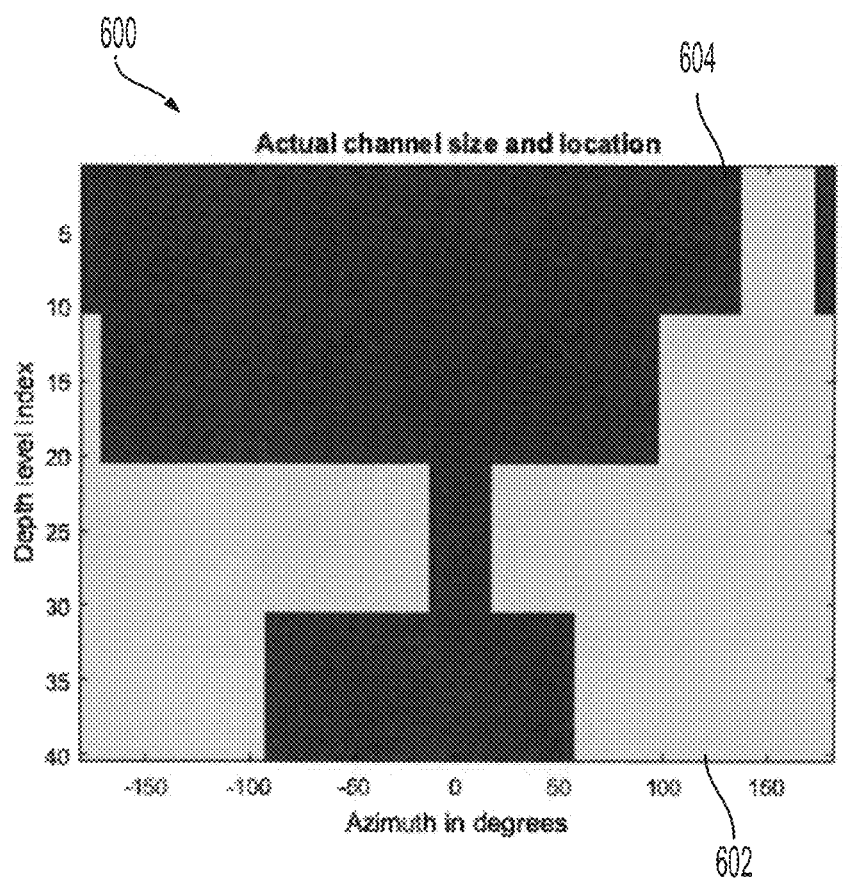
FIG. 6 is an image representing an actual channel size and location, in accordance with some examples.

FIG. 6 is an image 600 representing an actual channel size and location according to an example. FIG. 6 shows an actual channel image for a synthetic test. As shown in FIG. 6, the first section 602 represents a channel and a second section 604 represents an absence of the channel. FIG. 6 indicates a size and location of the channel with respect to a depth level index and an azimuth in degrees.

Figure 7:
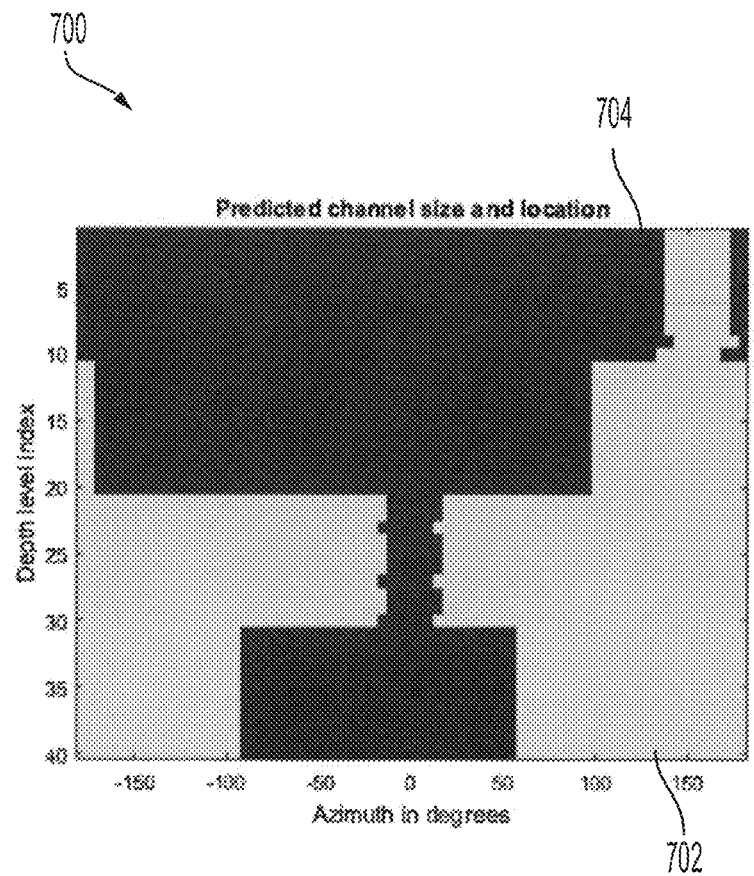
FIG. 7 is another image representing a predicted channel size and location, in accordance with some examples.

FIG. 7 is an image 700 representing a predicted channel size and location as generated by the system 200 according to an example. FIG. 7 shows a predicted channel image as determined by the machine learning random forest model that may be trained with the data. Again, a first section 702 represents a channel and a second section 704 represents an absence of the channel. FIG. 7 indicates a size and location of the channel with respect to a depth level index and an azimuth in degrees. Thus, the random forest regression algorithm may be trained with data (e.g., integral amplitudes) that may be affected by various factors and a corresponding channel specification (e.g., location and size). Alternatively, a different attribute other than integral amplitudes may be used. The trained model may be used to accurately predict channels from data in the field that may be affected by factors such as mud conditions and receiver behavior.

Having disclosed some example system components and concepts, the disclosure now turns to FIG. 8, which illustrates an example method 800 for detecting a channel behind casing and generating an image that represents the channel. For the sake of clarity, the method 800 is described in terms of the channel detection system 200, as shown in FIG. 2, configured to practice the method. The steps outlined herein are exemplary and can be implemented in any combination thereof, including combinations that exclude, add, or modify certain steps.

At step 802, the channel detection system 200 can determine integral amplitude for one or more azimuthal receivers to generate training data. The training data may be synthetic data and/or data that represents known channels behind casing. At step 804, the channel detection system 200 can train one or more random forest models using the training data. At step 806, the channel detection system 200 can test prediction accuracy of the random forest models. At step 808, the channel detection system 200 can use the random forest models to predict channels from integral amplitudes measured from sonic waveform data at depths of interest. At step 810, the channel detection system 200 can generate a channel image and/or a channel map that represents the absence and/or presence of a channel behind casing based on the waveform data. The channel image may be a two-dimensional image or another type of image.

FIG. 9 illustrates another method 900 for determining an integral amplitude attribute. For the sake of clarity, the method 900 is described in terms of the channel detection system 200, as shown in FIG. 2, configured to practice the method. The steps outlined herein are exemplary and can be implemented in any combination thereof, including combinations that exclude, add, or modify certain steps.

At step 902, the channel detection system 200 can de-trend and/or resample waveform data from one or more receivers of the tool. The waveform data may be sampled at too high of a frequency and some of the data may be discarded or not considered. At step 904, the channel detection system 200 can determine peak based envelopes of the rectified waveform data. At step 906, the channel detection system 200 can modulate the sinusoid signal with an envelope. At step 908, the channel detection system 200 can extract a first period of modulated signal and integrate to obtain an integral amplitude attribute.

FIG. 10 illustrates a method 1000 for detecting a channel behind casing and generating an image that represents the channel. For the sake of clarity, the method 1000 is described in terms of the channel detection system 200, as shown in FIG. 2, configured to practice the method. The steps outlined herein are exemplary and can be implemented in any combination thereof, including combinations that exclude, add, or modify certain steps.

At step 1002, the channel detection system 200 can receive data samples associated with at least one casing, each data sample representing channel information behind a representative casing. At step 1004, the channel detection system 200 can train a machine learning model using the data samples to generate a mapping between waveform information in each of the data samples and the channel information behind the representative casing. At step 1006, the channel detection system 200 can receive acoustic data from the tool 212. The acoustic data may represent a particular casing. At step 1008, the channel detection system 200 can use the machine learning model to analyze the acoustic data from the tool 212 and determine of a presence and an absence of a channel behind the particular casing at a plurality of depths. At step 1010, the channel detection system 200 can generate an azimuthal cement bond depth channel image that represents the presence and the absence of the channel behind the particular casing at the plurality of depths.

The channel detection system 200 can generate an azimuthal cement bond depth channel image that represents the presence and the absence of the channel behind the particular casing at the plurality of depths. The channel image may be a binary two-dimensional image. In addition, the binary two-dimensional image can represent a size and an azimuthal location of the channel behind the particular casing at the plurality of depths. The location may be an azimuthal location. The machine learning model can be based on random forest, among other algorithms.

Additionally, the tool 212 can be at least one array of receivers azimuthally arranged along a circumference of the tool. The array of receivers can determine an integral amplitude for waveform data obtained by the at least one array of receivers. Additionally, a ring of receivers can be one of three feet and five feet from the casing.

Having disclosed example systems, methods, and technologies for detecting a channel behind casing and generating an image that represents the channel, the disclosure now turns to FIG. 11, which illustrates an example computing device architecture 1100 which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 11 illustrates an example computing device architecture 1100 of a computing device which can implement the various technologies and techniques described herein. For example, the computing device architecture 1100 can implement the system 200 shown in FIG. 2 and perform various steps, methods, and techniques disclosed herein. The components of the computing device architecture 1100 are shown in electrical communication with each other using a connection 1105, such as a bus. The example computing device architecture 1100 includes a processing unit (CPU or processor) 1110 and a computing device connection 1105 that couples various computing device components including the computing device memory 1115, such as read only memory (ROM) 1120 and random access memory (RAM) 1125, to the processor 1110.

The computing device architecture 1100 can include a cache of high-speed memory connected directly with, in close proximity to, or integrated as part of the processor 1110. The computing device architecture 1100 can copy data from the memory 1115 and/or the storage device 1130 to the cache 1112 for quick access by the processor 1110. In this way, the cache can provide a performance boost that avoids processor 1110 delays while waiting for data. These and other modules can control or be configured to control the processor 1110 to perform various actions. Other computing device memory 1115 may be available for use as well. The memory 1115 can include multiple different types of memory with different performance characteristics. The processor 1110 can include any general purpose processor and a hardware or software service, such as service 1 1132, service 2 1134, and service 3 1136 stored in storage device 1130, configured to control the processor 1110 as well as a special-purpose processor where software instructions are incorporated into the processor design. The processor 1110 may be a self-contained system, containing multiple cores or processors, a bus, memory controller, cache, etc. A multi-core processor may be symmetric or asymmetric.

To enable user interaction with the computing device architecture 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art, such as a display, projector, television, speaker device, etc. In some instances, multimodal computing devices can enable a user to provide multiple types of input to communicate with the computing device architecture 1100. The communications interface 1140 can generally govern and manage the user input and computing device output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof. The storage device 1130 can include services 1132, 1134, 1136 for controlling the processor 1110. Other hardware or software modules are contemplated. The storage device 1130 can be connected to the computing device connection 1105. In one aspect, a hardware module that performs a particular function can include the software component stored in a computer-readable medium in connection with the necessary hardware components, such as the processor 1110, connection 1105, output device 1135, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data, which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purpose computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1: A method comprising receiving, by at least one processor, data samples associated with at least one casing, each data sample representing channel information behind a representative casing, training, by the at least one processor, a machine learning model using the data samples to generate a mapping between waveform information in each of the data samples and the channel information behind the representative casing, receiving, by the at least one processor, acoustic data from a tool, the acoustic data representing a particular casing, and using, by the at least one processor, the machine learning model to analyze the acoustic data from the tool and determine one of a presence and an absence of a channel behind the particular casing at a plurality of depths.

Statement 2: A method according to Statement 1, further comprising generating an azimuthal cement bond depth channel image that represents the presence and the absence of the channel behind the particular casing at the plurality of depths.

Statement 3: A method according to any of Statements 1 and 2, wherein the channel image is a binary two-dimensional image.

Statement 4: A method according to any of Statements 1 through 3, wherein the binary two-dimensional image represents a size and an azimuthal location of the channel behind the particular casing at the plurality of depths.

Statement 5: A method according to any of Statements 1 through 4, wherein the tool comprises at least one array of receivers azimuthally arranged along a circumference of the tool.

Statement 6: A method according to any of Statements 1 through 5, further comprising determining an integral amplitude for waveform data obtained by the at least one array of receivers.

Statement 7: A method according to any of Statements 1 through 6, wherein a ring of receivers is one of three feet and five feet from the casing.

Statement 8: A method according to any of Statements 1 through 7, wherein the machine learning model is based on random forest.

Statement 9: A system comprising an acoustic tool comprising at least one sensor, at least one processor, and at least one computer-readable storage medium having stored therein instructions, which when executed by the at least one processor cause the system to: receive data samples associated with at least one casing, each data sample representing channel information behind a representative casing, train a machine learning model using the data samples to generate a mapping between waveform information in each of the data samples and the channel information behind the representative casing, receive acoustic data from the tool, the acoustic data representing a particular casing, and use the machine learning model to analyze the acoustic data from the tool and determine one of a presence and an absence of a channel behind the particular casing at a plurality of depths.

Statement 10: A system according to Statement 9, the at least one processor further to generate an azimuthal cement bond depth channel image that represents the presence and the absence of the channel behind the particular casing at the plurality of depths.

Statement 11: A system according to any of Statements 9 and 10, wherein the channel image is a binary two-dimensional image.

Statement 12: A system according to any of Statements 9 through 11, wherein the binary two-dimensional image represents a size and an azimuthal location of the channel behind the particular casing at the plurality of depths.

Statement 13: A system according to any of Statements 9 through 12, wherein the acoustic tool comprises at least one array of receivers azimuthally arranged along a circumference of the tool.

Statement 14: A system according to any of Statements 9 through 13, the at least one processor further to dynamically sense in real-time, by the at least one sensor, the first indication to transition from the powered-off state to the low power standby state.

Statement 14: A system according to any of Statements 8 through 13, the at least one processor further to determine an integral amplitude for waveform data obtained by the at least one array of receivers.

Statement 15: A system according to any of Statements 9 through 14, wherein a ring of receivers is one of three feet and five feet from the casing.

Statement 16: A system according to any of Statements 9 through 15, wherein the machine learning model is based on random forest.

Statement 17: A non-transitory computer-readable storage medium comprising instructions stored on the non-transitory computer-readable storage medium, the instructions, when executed by one more processors, cause the one or more processors to perform operations including: receiving data samples associated with at least one casing, each data sample representing channel information behind a representative casing, training a machine learning model using the data samples to generate a mapping between waveform information in each of the data samples and the channel information behind the representative casing, receiving acoustic data from a tool, the acoustic data representing a particular casing, and using the machine learning model to analyze the acoustic data from the tool and determine one of a presence and an absence of a channel behind the particular casing at a plurality of depths.

Statement 18: A non-transitory computer-readable storage medium according to Statement 17, the operations further comprising generating an azimuthal cement bond depth channel image that represents the presence and the absence of the channel behind the particular casing at the plurality of depths.

Statement 19: A non-transitory computer-readable storage medium according to any of Statements 17 and 18, wherein the channel image is a binary two-dimensional image.

Statement 20: A non-transitory computer-readable storage medium according to any of Statements 17 through 19, wherein the binary two-dimensional image represents a size and an azimuthal location of the channel behind the particular casing at the plurality of depths.

Statement 21: A system comprising means for performing a method according to any of Statements 1 through 8.

What is claimed is:

1. A method comprising:
   receiving, by at least one processor, data samples associated with at least one casing, each data sample representing information associated with a channel located behind a representative casing;
   identifying local extrema of a rectified set of waveform information based on a specified separation associated with maxima or minima of the set of rectified waveform information, and differences in amplitude between a sample of the data samples and at least two neighboring samples of the sample of the data samples;
   generating a peaks-based envelope of the set of rectified waveform information by fitting one or more splines through the local extrema of the rectified set of waveform information, wherein at least one of the local extrema are not fit to the one or more splines when the peaks-based envelope is generated;
   applying the peaks-based envelope to modulate a signal;
   integrating a period of the modulated signal to obtain respective integral amplitudes for each of the data samples;
   training, by the at least one processor, a machine learning model based on a mapping that maps the respective integral amplitudes for each of the data samples to the information associated with the channel located behind the representative casing;
   receiving, by the at least one processor, acoustic data from a tool, the acoustic data received from the tool representing a particular casing;
   calculating a plurality of acoustic integral amplitudes based on the received acoustic data; and
   applying the machine learning model based on the calculated plurality of acoustic integral amplitudes from the acoustic data to identify at least one of a presence of a channel or an absence of the channel behind the particular casing at a plurality of depths.

2. The method of claim 1, further comprising generating an azimuthal cement bond depth channel image that represents the presence and the absence of the channel behind the particular casing at the plurality of depths, wherein the channel image is a binary two-dimensional image that represents a size and an azimuthal location of the channel behind the particular casing at the plurality of depths.

3. The method of claim 1, further comprising:
   identifying by the at least one processor, absolute values of amplitudes included in a set of waveform information; and
   performing a rectification function on the set of waveform information to generate the rectified set of waveform information, wherein the tool comprises at least one array of receivers azimuthally arranged along a circumference of the tool.

4. The method of claim 3, wherein the tool comprises a monopole transmitter that transmits waves having a frequency less than ultrasound frequencies.

5. The method of claim 3, wherein the tool comprises a monopole transmitter, and wherein a ring of receivers is one of three feet and five feet from the monopole transmitter.

6. The method of claim 1, wherein the machine learning model is a regression model based on random forest.

7. A system comprising:
   an acoustic tool comprising at least one sensor;

at least one processor; and at least one computer-readable storage medium having stored therein instructions, which when executed by the at least one processor cause the system to:

receive data samples associated with at least one casing, each data sample representing information associated with a channel located behind a representative casing;

identify local extrema of a rectified set of waveform information based on a specified separation associated with maxima or minima of the set of rectified waveform information, and differences in amplitude between a sample of the data samples and at least two neighboring samples of the sample of the data samples;

generate a peaks-based envelope of the set of rectified waveform information by fitting one or more splines through the local extrema of the rectified set of waveform information, wherein at least one of the local extrema are not fit to the one or more splines when the peaks-based envelope is generated;

apply the peaks-based envelope to modulate a signal;

integrate a period of the modulated signal to obtain respective integral amplitudes for each of the data samples;

train a machine learning model based on a mapping that maps the respective integral amplitudes for each of the data samples to the information associated with the channel located behind the representative casing;

receive acoustic data from the tool, the acoustic data representing a particular casing;

calculate a plurality of acoustic integral amplitudes based on the received acoustic data; and apply the machine learning model based on the calculated plurality of acoustic integral amplitudes from the acoustic data from the tool to identify at least one of a presence of a channel or an absence of the channel behind the particular casing at a plurality of depths.

8. The system of claim 7, wherein an azimuthal cement bond depth channel image that represents the presence and the absence of the channel behind the particular casing at the plurality of depths is generated, and the channel image is a binary two-dimensional image that represents a size and an azimuthal location of the channel behind the particular casing at the plurality of depths.

9. The system of claim 7, wherein the at least one processor executes the instructions to:

identify absolute values of amplitudes included in a set of waveform information; and perform a rectification function on the set of waveform information to generate the rectified set of waveform information, and the acoustic tool comprises at least one array of receivers azimuthally arranged along a circumference of the tool.

10. The system of claim 9, wherein the acoustic tool comprises a monopole transmitter that transmits waves having a frequency less than ultrasound frequencies.

11. The system of claim 9, wherein the acoustic tool comprises a monopole transmitter, and wherein a ring of receivers is one of three feet and five feet from the monopole transmitter.

12. The system of claim 7, wherein the machine learning model is a regression model based on random forest.

13. A non-transitory computer-readable medium having instructions stored thereon that, when executed by at least one processor, cause the at least one processor to perform operations comprising:

receiving data samples associated with at least one casing, each data sample representing information associated with a channel located behind a representative casing;

identifying local extrema of a rectified set of waveform information based on a specified separation associated with maxima or minima of the set of rectified waveform information, and differences in amplitude between a sample of the data samples and at least two neighboring samples of the sample of the data samples;

generating a peaks-based envelope of the set of rectified waveform information by fitting one or more splines through the local extrema of the rectified set of waveform information, wherein at least one of the local extrema are not fit to the one or more splines when the peaks-based envelope is generated;

applying the peaks-based envelope to modulate a signal;

integrating a period of the modulated signal to obtain respective integral amplitudes for each of the data samples;

training a machine learning model based on a mapping that maps the respective integral amplitudes for each of the data samples to the information associated with the channel located behind the representative casing;

receiving acoustic data from a tool, the acoustic data received from the tool representing a particular casing;

calculating a plurality of acoustic integral amplitudes based on the received acoustic data; and applying the machine learning model based on the calculated plurality of acoustic integral amplitudes from the acoustic data to determine one of a presence of a channel or an absence of the channel behind the particular casing at a plurality of depths.

14. The non-transitory computer-readable medium of claim 13, wherein an azimuthal cement bond depth channel image that represents the presence and the absence of the channel behind the particular casing at the plurality of depths is generated and the channel image is a binary two-dimensional image that represents a size and an azimuthal location of the channel behind the particular casing at the plurality of depths.

* * * * *